US006603464B1

(12) United States Patent
Rabin (10) Patent No.: US 6,603,464 B1
(45) Date of Patent: Aug. 5, 2003

(54) APPARATUS AND METHOD FOR RECORD KEEPING AND INFORMATION DISTRIBUTION

(76) Inventor: Michael Irl Rabin, 938 Chestnut Run, Gates Mills, OH (US) 44040

( * ) Notice: Subject to any disclaimer, the term of this patent is extended or adjusted under 35 U.S.C. 154(b) by 184 days.

(21) Appl. No.: 09/798,222

(22) Filed: Mar. 2, 2001

Related U.S. Application Data

(60) Provisional application No. 60/186,866, filed on Mar. 3, 2000.

(51) Int. Cl.[7] .................................................. G09G 5/00
(52) U.S. Cl. ...................... 345/179; 345/175; 345/177; 178/18.01; 178/18.02; 178/18.03; 178/18.04; 178/18.05; 178/18.06; 178/18.07; 382/312; 382/313; 382/314; 358/473
(58) Field of Search ................................ 345/175, 177, 345/179; 178/18.01, 18.02, 18.03, 18.04, 18.05, 18.06, 18.07; 382/119, 181, 186, 187, 188, 312, 313, 314; 358/473, 474, 478

(56) References Cited

U.S. PATENT DOCUMENTS

| | | | |
|---|---|---|---|
| 5,051,736 A | * | 9/1991 | Bennett et al. ............. 345/180 |
| 5,215,397 A | * | 6/1993 | Taguchi et al. ............. 382/188 |
| 5,308,936 A | | 5/1994 | Biggs et al. ................... 178/18 |
| 5,546,565 A | | 8/1996 | Suzuki ........................ 395/500 |
| 5,563,381 A | | 10/1996 | Crooks et al. ................ 178/18 |
| 5,581,783 A | | 12/1996 | Ohashi ........................ 395/825 |
| 5,850,214 A | | 12/1998 | McNally et al. ............ 345/173 |
| 5,939,702 A | | 8/1999 | Knighton et al. ...... 235/472.03 |
| 5,953,001 A | | 9/1999 | Challener et al. ........... 345/179 |
| 5,953,494 A | | 9/1999 | Okayasu ..................... 395/103 |
| 5,969,711 A | | 10/1999 | Menzel ....................... 345/179 |
| 6,151,611 A | * | 11/2000 | Siegel ......................... 707/541 |
| 6,265,706 B1 | * | 7/2001 | Oliver et al. ............... 358/473 |

* cited by examiner

Primary Examiner—Richard Hjerpe
Assistant Examiner—Jean Lesperance
(74) Attorney, Agent, or Firm—Patrick J. Daugherty; Driggs, Lucas, Brubaker & Hogg Co., LPA (57) ABSTRACT

A method of capturing data having the steps of writing on a form with a pen to leave an image on the form, scanning the written image as the written image is being written, and storing the scanned written image in a specific data field. A method of capturing an input, including written information, sounds and images includes the steps of specifying a data field by touching a pen tip to a data-field-specific area on a form; supplying the input; electronically capturing the input and associating the input with the specified data field. An information capturing system, includes a pen, the pen including a writing tip and a position transducer to determine the position of the writing tip relative to a form.

17 Claims, 3 Drawing Sheets

| | | | | | | | |
|---|---|---|---|---|---|---|---|
| NAME | | | AGE | DATE | | male | female |
| CC: | | | | | | | |
| HPI: (history of present illness, including symptoms, duration, intensity, prior episodes, family history, etc. | | | | | | | |
| | | | | | | | |
| ROS: | | | | | | | |

| | | | |
|---|---|---|---|
| CONSTITUTIONAL | • HEADCIRC. | WT HT LF TIME W | |
| | • BODYTYPE | NORMAL WELL DEVELOPED WELL PROPORTIONED MEDICATION FEMALE | |
| EARS, NOSE MOUTH AND THROAT | • EARS | NORMAL DEVELOPED(2) W. PROPORTIONED | |
| | • NOSE | NORM. DEVELOPED PROPORTIONED | |
| | • THROAT • MOUTH | NORMAL WELL DEVELOPED WELL PROPORTIONED MEDICATION MISC. OTHER | |
| | | NORMAL WELL DEVELOPED | |
| EYES | INSPECT | NORMAL DEVELOPED PROPORTIONED MEDICATION | |
| | • EXAM | FUNDUS RETINA CORNEA PUPIL OPTIC | |

Fig. 3a

APPARATUS AND METHOD FOR RECORD KEEPING AND INFORMATION DISTRIBUTION

CROSS REFERENCE TO RELATED APPLICATION

This application is a continuation of provisional patent application Ser. No. 60/186,866, filed Mar. 3, 2000.

TECHNICAL FIELD

The present invention generally relates to document and information management and, more particularly, to a method and system for collecting, capturing, storing and distributing written, auditory and optical information.

BACKGROUND ART

There is an ever present demand for more efficient and complete ways to collect, document, store, distribute, access, and act upon (automatically, or otherwise) information in written, auditory and/or optical form. Today, information is typically collected using paper forms having fields to be filled in by hand with a writing instrument, such as a pen. This method of information collection limits the subsequent use of the collected data. To save the information contained on the completed form electronically for use in electronic applications, the information will have to be entered into a computer system, typically by typing.

Alternatively, the forms may be in electronic form and presented to the information provider on a visual monitor. These types of forms are filled out using computer input devices such as a keyboard, mouse, or electronic stylus pen such as those used with personal digital assistants (e.g., PALM PILOT computer). However, there are many situations where a computer is unavailable to the information provider or other factors limit the use of a computer. An exemplary situation where the use of a computer is limited is during the interviewing, examination and treatment of a patient by a doctor. The standard information collection medium by the doctor or medical support staff is by writing notes on paper forms with a writing implement such as a pen. Sometimes, additional information is collected by dictating, which is later transcribed. In addition, billing slips may be marked by checking off boxes next to current procedure terminology (CPT) and international classification of diseases.(ICD) codes. Information is usually distributed by the doctor in the form of pieces of paper with handwritten instructions, such as a prescription written on a prescription sheet. In addition, the same information may have to be written more than once where the information is needed in multiple locations. The foregoing exemplary method of data collection is not only limited to collecting written and spoken information, the method limits future use of the information unless it is entered into a computer system in electronic form. Entering the information is time consuming and introduces the possibility of data entry errors.

SUMMARY OF THE INVENTION

The present invention provides a method of capturing data having the steps of writing on a form with a pen to leave an image on the form, scanning the written image as the written image is being written, and storing the scanned written image in a specific data field.

According to another aspect of the invention, a method of capturing an input, including written information, sounds and images includes the steps of specifying a data field by touching a pen tip to a data-field-specific area on a form; supplying the input; electronically capturing the input and associating the input with the specified data field.

According to another aspect of the invention, an information capturing system, includes a pen, the pen including a writing tip and a position transducer to determine the position of the writing tip relative to a form.

BRIEF DESCRIPTION OF DRAWINGS

These and further features of the present invention will be apparent with reference to the following description and drawings, wherein.

DISCLOSURE OF INVENTION

INTRODUCTION

In the detailed description, which follows, identical components have been given the same reference numerals, regardless of whether they are shown in different embodiments of the present invention. To illustrate the present invention in a clear and concise manner, the drawings may not necessarily be to scale and certain features may be shown in somewhat schematic form.

In general, the present invention relates to devices and software used to capture inputs, such as written words, spoken words, sounds, optical images and the like. Once this information is captured, the devices and software can convert (and/or facilitate the conversion of ) the written and spoken words into text which can be electronically stored in a database, then formatted and transmitted to other systems and/or individuals (e.g., email to pharmacy, lab, insurance company, consultant, etc.) for review and/or action, or manipulated using software programs such as information analysis systems, outcome management systems, billing compliance systems, spreadsheets, word processors and the like. Other sounds and images are stored in a format that can be retrieved, accessed and manipulated.

The present invention has application in any environment where information needs to be collected and then later accessed or disseminated. An exemplary environment used for illustrative purposes herein, but not intended to limit the scope of the present invention, is in the medical care disciplines. Other disciplines include, but are not limited to, the legal profession, accounting, tax preparation, other service industries and manufacturing. When a patient sees a doctor, information typically is gathered about the patient upon his or her arrival by office staff and/or nurses. More information is gathered by the physician, laboratory analysis, and other specialized departments, for example, radiology. Then, additional information is disseminated to the patient (e.g., instructions), a pharmacy (e.g., a prescription), insurance companies (e.g., billing information) and the like.

APPARATUS

Figure 1:
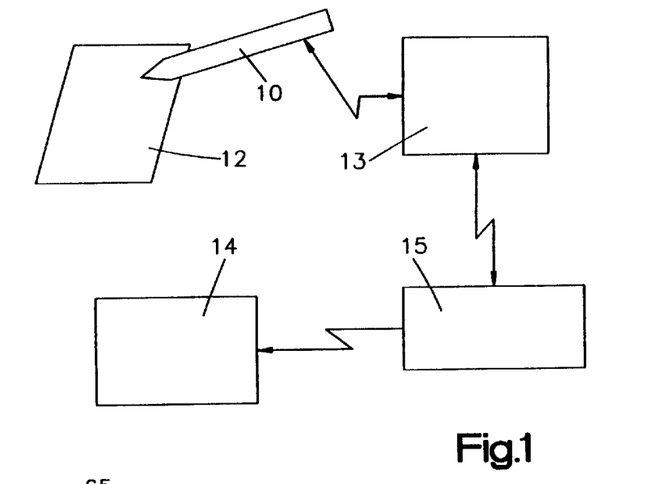
FIG. 1 is a block diagram of an apparatus system according to the present invention.

Referring to FIG. 1, the present invention has a pen 10, a paper form 12, and a new software process run on a local computer 13. The computer 13 is programmed to capture inputs resulting from a user working with the pen and form. The computer can interface with other computers 14, printers and other peripheral devices over a network backbone 15. The computer includes a memory for storing data and computer programs, a processor, an input device, such as a keyboard, mouse, the pen 10, etc., and a display.

Figure 2:
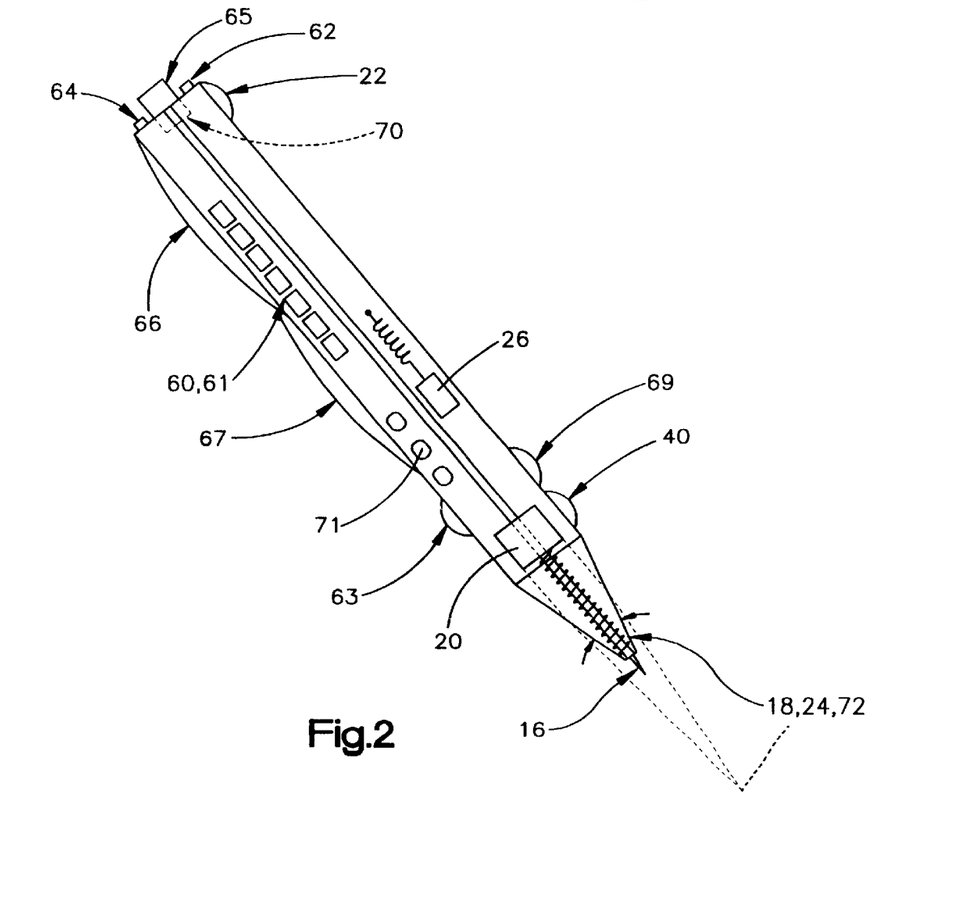
FIG. 2 is a schematic diagram of a pen according to the present invention.

With additional reference to FIG. 2, the pen has a writing tip 16, such as a ballpoint pen as is well known in the art. After touching the writing tip of the pen to the form and moving the pen across the form, ink dispensed from the writing tip will be left in the path of the writing tip. The pen also has a number of input mechanisms, including an optical scanner 18 for scanning lines and characters written with the tip or printed on the form (e.g., a laser bar code type reader not requiring physical contact with the scanned surface), a position scanner 20 as will be discussed in more detail below, a microphone 22 for picking up sounds (e.g., voice and heartbeat sounds), and a camera 24 for capturing still and/or moving images such as a charged coupled device (CCD) imaging unit. A read head of the scanner 18 is located adjacent and in close proximity to the writing tip of the pen. In another embodiment, the ink from the pen may include magnetic particles, which can be detected by a magnetic scanner.

The pen temporarily stores gathered input information into a memory, such as a digital flash RAM. Via a bidirectional communication device 26, the information collected from the input mechanisms is sent from the memory of the pen to the computer for further processing and storage. The communication device can be a hard wire connection to the computer, a radio frequency (RF) transmitter/receiver, an optical link or the like. The computer is provided with a corresponding communication transmitting/receiving hub.

In addition to circuitry 60 and programming for analog to digital conversion of sound, image, or other analog inputs, the pen may be equipped with circuitry 61 and programming for digital signal processing in the event that certain inputs need to be filtered, interpreted, or otherwise manipulated prior to transmission to the computer. Alternatively, the pen may process and transmit captured information in the analog domain, leaving analog to digital conversion, if desired, and subsequent digital processing to the computer.

Other pen features can include the following. An audio record-on LED 62 which lights up or blinks red, or other specified color, when an audio record button 63 is depressed to activate the microphone. A camera-on LED 64 which lights up or blinks green, or other specified color, when the camera is capturing visual data. The camera can be turned on by depressing the pen tip so as to capture written data, or by retracting the pen tip by pressing a pen tip retraction button 65 and/or holding down the pen tip retraction button 65. Alternatively, a separate switch can be used to activate the optical device 70. The pen can also be equipped with a liquid crystal display or other display, a numeric or other keypad (can optionally be used to program the pen), a speaker volume adjustment 69, a power source 71, such as a battery power, and a light source (preferably originates from an optical lens opening).

Figure 3:
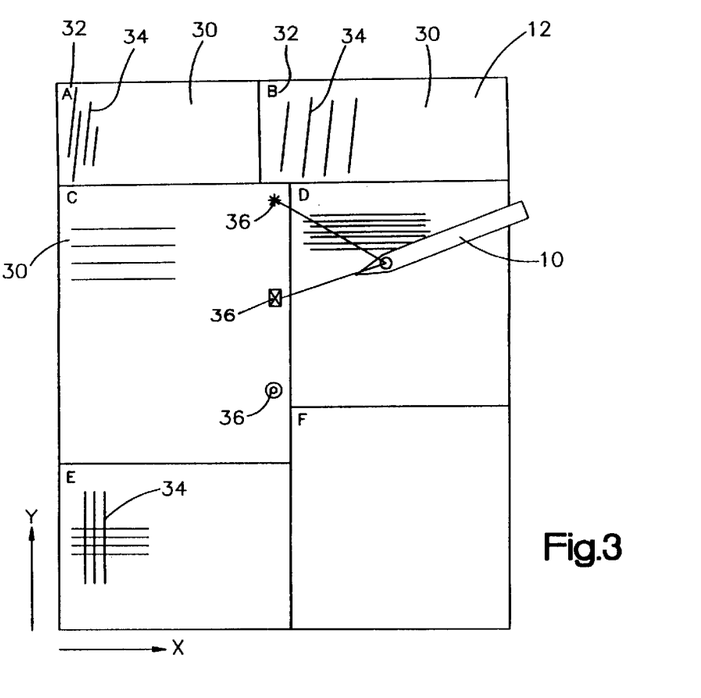
FIG. 3 is a schematic diagram of a form according to the present invention.

With additional reference to FIG. 3, the form is a printed sheet of paper, or other medium, having at least a top surface having printed indicia. Generally, the form is in a format which the user is accustomed to using, but also having the printed indicia as described in more detail below. The printed indicia serve at least two basic purposes. First, to establish fields 30 where the user is expected to write down certain types of information. Exemplary fields are labeled A through F in FIG. 3. By way of example, field A can be for a patient's name, field B can be for the patient's address, field C can be for the patient's chief medical complaint, field D can be for diagnosis, field E can be for prescribed medicines and field F can be for insurance billing codes.

Figure 3A:
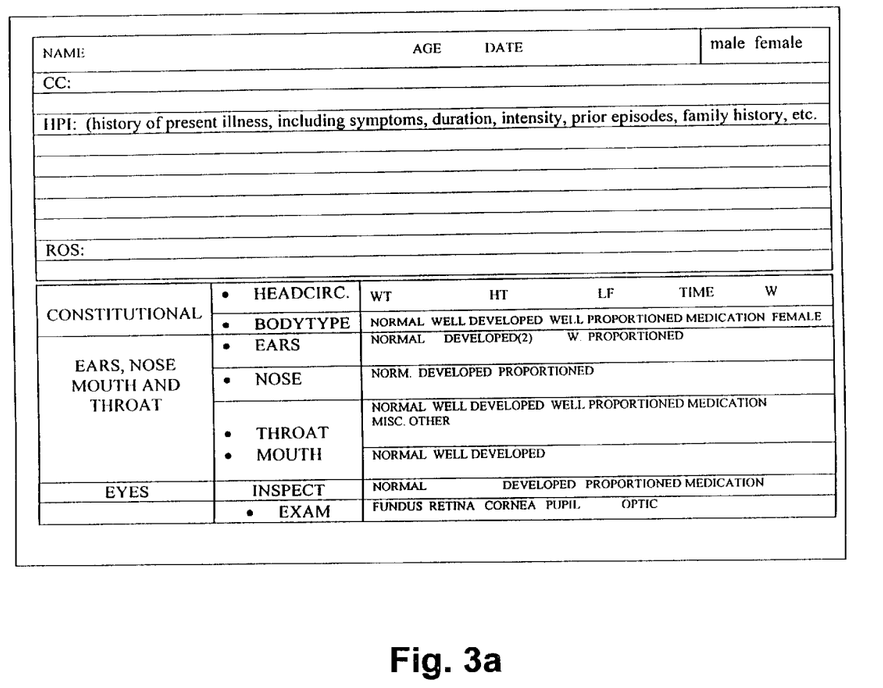
FIG. 3a is a schematic diagram of a form having a pixellated background pattern.

Second, the printed indicia is used by the pen and the computer to determine where on the form the user is writing, in terms of the field and position. Using these indicia, any position on the top surface of the form can be located using a horizontal, or X, coordinate and a vertical, or Y, coordinate. Each field is identifiable by a unique printed reference image 32 and/or a unique background pattern 34. The images can be letters as illustrated in FIG. 3, made up characters, a small bar code or any other similar type of printed image which can be identified by the scanner 18. The background pattern, if used, is a lightly printed image, which further identifies the field. The background image can be combinations of lines having differing thicknesses, having different spacing and different angles or other geometric properties, or can be unique pixilated patterns that are placed in small squares or other shapes throughout the form, as is shown in FIG. 3a, background. The background images can be linear or non-linear, and/or continuous or non-continuous. Alternatively, the background images can form regular or irregular patterns such as snowflake type patterns.

The form is also provided with position reference indicators 36 located in strategic places on the form. The position indicators can be in the form of numbers, letters, made up characters as illustrated or any other unique identifier. Using the position scanner 20, distance from the pen to one or more of the position references can be determined. The distances can then be used to calculate the XY position of the writing tip of the pen with respect to the form. These measurements may be made when the user is writing. When the user is writing can be determined by monitoring pressure being applied to the writing tip of the pen using, for example, a switch. Continuous updating of the pen's XY position in combination with the information collected from the scanner 18 during writing can be used to reproduce the written text by the computer, and, if desired convert the scanned written information into identifiable characters.

An alternative background useful to determine position of the pen tip is a background having a pattern of vertical and horizontal lines. Position is determined by two parameters. First, the space between the lines (e.g., increments of 0.1 mm). Second, features contained within the lines (e.g., dotted line, dashed line or line containing dashes and dots; and the spacing between the dots/dashes). Position is determined by the identity of the closest vertical and horizontal line.

In another embodiment, pen tip position is identified using a unique background or plurality of background objects in combination with an automated image stitching or image assembly algorithm (i.e., similar to algorithms used to create a montage or panoramic scene from a series of photographs with overlapping fields of view). The computer will take the image data captured with either the optical scanner 18 or the camera 24 and piece together any hand written or scanned information. It should be noted that the optical scanner 18 and the camera 24 can be separate devices or the same device with the capability to perform the functions of both.

Figure 2A:
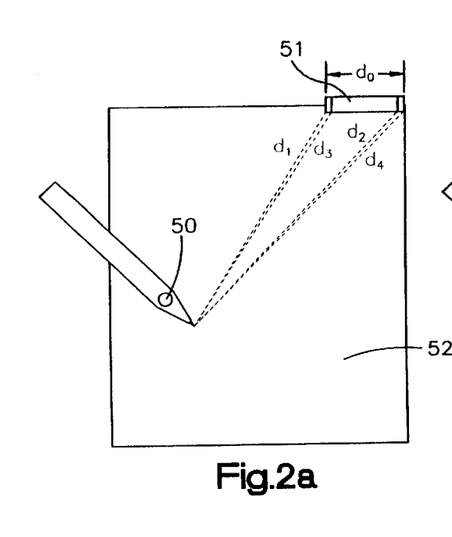
FIG. 2a is a schematic diagram of a first embodiment of an electromagnetic pen position measurement device.

In another embodiment, (FIG. 2a) the pen is equipped with a small electromagnetic transducer 50 near the pen tip.

Figure 2B:
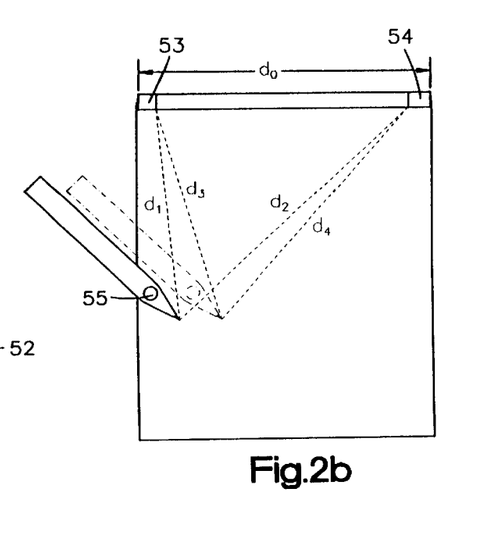
FIG. 2b is a schematic diagram of a second embodiment of the electromagnetic pen position measurement device.

A separate elongated piece of material with a known length 51 that may be stored attached to the pen is removed and placed on a form 52, or any piece of paper or medium that accepts writing, in a precise location (e.g., disposed horizontally along an upper edge and in the upper right corner). This piece of material, or "clip" has material with inductive properties at either end. A small battery activates the inductive properties (selectively turned on or off by a powered switch on the clip), by alternatively supplying current to the inductive ends. By applying current to the inductive ends, an electromagnetic field is generated. The distance between the inductive ends, or d0, is known. Electromagnetic field strength measurements can be continually taken by a transducer 50 when the pen tip is depressed (i.e., as in writing) and the field strength measurements can be converted to distance measurements between the transducer (a proxy for the pen tip) and clip ends (shown in FIG. 2a as d1, d2 and d3, d4). The distance measurements can be used to derive pen tip position as hand-writing occurs from simple geometric principles. Therefore, the pen tip position on the paper may be derived, as long as the clip's position is known. In another embodiment (FIG. 2b), any material with inductive, reflective, and/or other uniquely discernible quality that is precisely placed at two distinct points 53, 54 (spaced apart a known distance, or d0) on the form and may be distinguished (from the material at the other point) by a device 55 in close proximity to the pen tip to produce the distance measurements (d1, d2 and d0, d3, d4) used to determine pen tip location as hand-writing occurs.

Another manner in which the pen, form, and computer may be used is where the form is displayed on the computer and the user points and clicks (using a mouse or other selection device) on an area where text will be written and/or dictation will be supplied or other input will be provided. The user may then provide the input associated with the selected area using the pen. In the case of handwriting, the user may begin writing on any piece of paper or other medium capable of being written upon. The initial character or mark will be placed on the computer-displayed displayed form in the location selected in the 'point and click' step. Subsequent characters or marks will be placed in their relative positions to the initial (and subsequent) characters or marks through a method of using the just written characters or marks as the uniquely defined background to determine relative XY position for the new characters or marks. (This particular use may be applied when hand-writing occurs in a small enough area where just written characters or marks are captured in the continuous scan process, while the user continues to write.)

The computer receives the inputs, including scanned writing, sounds and imagery, and converts the inputs into structured data formats. The scanned written data is associated with one of the fields by either first scanning the reference image 32 or identifying the field from the background pattern 34 or from the user introducing the field through speech. The scanned written data is then reproduced, in digital form, into an identical set of fields in a database and optionally associated with the same XY position on the form as written by the user. In addition, any written text can be translated into corresponding characters (e.g., ASCII characters). The scanned writing can be converted to characters using optical character recognition (OCR) routines or by using pen position and movement to determine what has been written. The computer can have a general language dictionary (e.g., English) and a medical dictionary to assist the computer distinguish as many words as possible. In addition, field specific dictionaries may be defined to narrow the computer's choices for interpretation (e.g., a lab order dictionary will be applied only to writing and/or sound that is captured in the lab order area or field). Furthermore, hand-writing and sound to text translations, as well as other complex data analyses will be performed on very powerful centrally located servers, after the data is compressed where necessary and transmitted in real-time over a local-area-network or wide-area-network, such as the Internet.

Using the microphone in the pen, the user can also issue commands to the computer, such as generating a printout, playing back a sound, calling a nurse, ordering a test, and so forth. To distinguish commands, the computer can be programmed with a command dictionary.

Sound inputs are captured and stored as a data element. The captured sounds can be associated with one or more of the fields in the database and contained with any written information also associated with the field. Any spoken words can be converted to written text via voice recognition software and/or human transcription. Other sounds, such as a heartbeat, breath sounds and the like, can be stored and played back upon the user request through a speaker 40 located on the pen or other location.

The pen can be used in a location remote from the computer. For example, the pen can be used in an examination room and the computer can be located in an office administrator's office. A monitor, keyboard and other workstation devices connected to the computer can be placed in strategic places where the pen is likely to be used or where access to stored information may be desired. The computer can have communication links to more than one pen, so that multiple users can capture information at the same time.

One skilled in the art will appreciate that the system according to the present invention can be used with any number of predefined forms. The fields and printed indicia for each form are stored in the computer. For, example a medical office may have a patient information form, a scheduling form, a patient history form to be completed by the treating medical profession, and a billing form.

METHOD

The present invention captures information gathered with the pen or other input devices, such as a scanner, microphone, camera, electronic file (e.g., a digital representation of an EKG) and the like, and converts these inputs into structured medical records. Optionally, the captured information is combined with existing medical records. The medical records are organized in a database residing on a computer and consist of ASCII text associated with fields (entered into the computer with a keyboard or other input device), hand-writing images scanned with the pen that have not been converted to text and/or ASCII text derived from the scanner hand-written images through software and/or human transcription or combination of the two. The database may contain other images, recorded sounds, and/or recorded voice sounds. The recorded voice sounds may be converted to ASCII text using software and/or human transcription, in which case, both the original recorded sound and the subsequent text can be stored in the associated record field.

For use in the medical field, the apparatus described above can be used in conjunction with at least the following steps.

a. Register patient in database at front office (e.g., have patient or support staff complete a patient information form having the indicia as described above using the pen).

b. Using the pen, scan (or "read") the treating physician's or nurse's personal identification code on an identification badge or other accessible place to identify the treating physician or nurse. For example, the scanner 18 in the pen 10 can be used for this purpose. The personal identification code can be in the form of a bar code, text or other symbol readable by the scanner. If the same person uses the same pen, this may need to be done once per day. If more than one person uses the same pen or workstation, this step may be performed for each patient/health care provider interaction. Should a scannable personal identification code not be available, the information can be entered by speaking or dictating the information into the microphone of the pen.

c. Scan patient code on chart or patient information form to identify patient.

d. Scan form identifier to identify specific type of form being used (e.g., patient history form, surgery/procedure summary form, insurance form, etc.).

e. Scan form field (or other form subsection) before entering information in that field to identify the field where information (spoken, sound, image or written) will next be entered. For written information, this step may be completed automatically by the pen scanning indicia unique to the field being written in.

f. Write on the form. The writing is concurrently or subsequently scanned with the scanner 18, and sent to the computer and stored as described above.

g. Dictation may be taken by the pen via the microphone at any time after the user depresses a record button on the Pen. To indicate that the pen is recording, an LED disposed on the pen may optionally be turned on (or flash). The speaking will be stored in the most recent field identified by the pen as described above.

h. Record sounds (e.g., heartbeat, breath sound, blood vessel sound, etc) with microphone or a special attachment coupling the microphone to an instrument, such as a stethoscope or other sound amplifying device. Alternatively, the sound can be picked up using an attachment, converted into an electrical signal by the attachment. The electrical signal can be sent from the attachment to the pen or the computer via connector and interface hardware.

i. Record images (e.g., nasal, throat ear, skin, etc.) using the camera. The camera can optionally be provided with light source and/or zoom capabilities. The image is viewable using a monitor connected to the local computer.

j. Fill out the billing section of the form with current procedure terminology (CPT) and international classification of diseases (ICD) codes used by the insurance industry to process claims. The codes can be entered with the pen by writing the code, checking boxes associated with a desired code, or by dictating the code. The computer is programmed to verify that the appropriate codes were entered based on other information entered and to provide positive or negative feedback to the user as to the rough accuracy of the code(s) entered. The feedback can be auditory via the speaker or visual via the monitor of the computer or LED on the pen. For example, if the patient's chief complaint, as recorded in the chief complaint field, was nose bleeds and the treatment section indicates that the physician cauterized blood vessels in the patient's nose, but the CPT and ICD code(s) entered were for treating a broken tibia, then the computer will provide a negative feedback. If the codes or other information were entered incorrectly, the user may correct the information. Alternatively, the CPT and ICD codes can be derived automatically from the information supplied in other fields of the form.

k. The medical personnel signs the form, or forms, with the writing tip of the pen.

l. The written hard copy of the form is placed in the patient's chart. Additional completed copies of the form(s) may be accessed via the computer and/or printed. The local computer used to receive information from the pen can be networked to other computers, printers, backup storage, periphery devices and the like over a network backbone (or multiple network backbones such as an intranet and an internet), so that the electronically stored forms can be accessed remotely and information can be shared. The computer can function as an Internet website server or be connected to an Internet website server so that persons can login from remote locations and access certain information stored in the electronic versions of the patient's charts. Optional security measures can be used to password protect each form/chart to reduce the likelihood that an unauthorized person can access the electronic version of the form(s).

a. Information is exported to appropriate destinations. For example, dictated or written instructions along with a facsimile of the physicians signature is transmitted to a lab to order tests. Other information can be exported to radiology to order scans and x-rays. Prescriptions can be ordered electronically from a pharmacy (in the medical facility or as selected by the patient). A transportation service can be informed that the patient is ready to be taken to another destination, either in the medical facility or other destination, such as the patient's home. Insurance and billing information can be sent to the patient's insurance provider, Medicaid, Medicare, etc. Medical information can also be reported to places such as the Center for Disease Control, other treating physicians, clinical study organizers, etc. Instructions to the patient can be printed and given to the patient before the patient leaves the medical facility. As needed, the exported information can be sent using internet-type security procedures (e.g., encrypted FTP). The format of the export can vary depending on the recipient and include, but are not limited to, e-mail, fax, data dump into recipient's database or file format, and sound file (e.g., ".wav" file). Included in the exported information is a patient header including information relevant to the recipient, such as name, address, demographic information, insurance account number, current medications, known allergies, etc. Once received by the recipient, the recipient can process the information and prepare an appropriate response (e.g., fill a prescription, complete insurance processing, prepare a laboratory procedure, etc.). Should the recipient have a question or identify a problem (e.g., potential drug interaction), a response can be sent electronically back to the computer. The computer is programmed to alert the physician or staff through, e-mail, auditory alert (on the computer or the pen), page or phone the physician, etc. If needed, an Internet style phone link can be established. The phone link can take advantage of the speaker, microphone and portability of the pen so that the user can carry out the conversation when not in close proximity to the computer.

m. Interact with information destination. Sounds and visual information can be retrieved, accessed and manipulated in a manner that may be similar to the handling of textual information (e.g., sound files may be transmitted to pharmacy, lab, etc. in combination with structured textual information such as patient name, date of birth, diagnosis, electronic physician signature, etc). Furthermore, such transmission of text and/or sound or other information to other systems may result in outputs or responses from these systems which may serve as another source of inputs to the invention being described here. For example, a sound file describing prescriptions for a patient that is captured and transmitted while the patient is in the exam room may result in a sound file or textual request from the pharmacy system to verify dosage amounts. The response is received and played, or displayed, for the physician user. As another example, a lab order sound file that is transmitted while the patient is in the room may result in an request from the lab-order-handling system to clarify diagnosis or to have the patient sign a non-coverage waiver, etc. As further examples, a particular cpt-icd billing code combination marked by the physician on a billing form may result in a prompt from the billing compliance system to check 'review of systems' for inadequacies or to consider a different cpt coding level that is consistent with the history and examination that are recorded on the form.

n. The stored information can be accessed at a later time or date and from any location by the treating physician or by another treating medical professional.
   a. Before claims are submitted (electronically or otherwise) to insurance, office personnel can review them.

In a variation to the method described above, external systems that receive (as inputs) outputs from the pen and/or computer described above may be centralized and optimized to handle such outputs. Here are just a few of many possible examples of external systems that may be centralized and optimized for use with the invention described:

a. Pharmacy: inputs received by an external pharmacy system may consist of a sound file describing the prescriptions requested and accompanied by patient insurance/demographic information in structured textual format, physician electronic signature (or digitized hand-written signature, as captured from the form), other pertinent information in structured textual format such as age, sex, weight, vital signs, diagnosis, current medications, certain laboratory studies, etc. The sound file is parsed with voice recognition software running on a dedicated workstation to convert speech to text and attach a probability of accuracy to it. Additionally, the process uses a pharmacy-specific vocabulary for matching of words and context along with an ordering physicianspecific/pharmacy-specific voice profile which is built with sound files from previously confirmed pharmacy orders placed by the current ordering physician along with any training sound files (i.e., known words and sentences that may have been read by the physician as part of a process to train the voice recognition system to correctly convert speech to text for the given physician). This combination of techniques greatly improves the accuracy of the speech to text conversion. After speech to text conversion, the prescription orders are compared against generally accepted dosages for age, sex, weight, diagnosis, certain laboratory values, etc. Such checks may result in real-time and/or batched prompt(s) (multiple issues presented in one transmission) to the ordering physician in various categories (e.g., informational, relative contraindication, absolute contraindication—in which case prescription will not be filled without ordering physician and pharmacist override). If the speech to text conversion has an acceptable accuracy level and there are no absolute contraindications identified then the prescription is automatically filled (e.g., labeled bottle prepared and auto-filled via a pharmacist-supervised robotics process) or manually filled by a pharmacist, packaged and shipped for next day delivery to the patient (the first dose(s) of medicine can be supplied by the physician to the patient in a start-pack). Regardless, a complete record of the processed prescriptions is transmitted to the ordering physician to be immediately played and/or viewed or viewed and verified in a batch routine, with subsequent update of the patient's record    b. Laboratory: Initial steps could be handled in similar fashion to Pharmacy system (i.e., immediate transmission to lab-processing server for speech to text conversion of sound file, etc.). Beyond that, ordering physicians may be prompted for additional information or clarification, in real time or in a batch fashion, depending upon the nature of the order problem. Also, issues of compliance (e.g., appropriate ICD code for the test ordered), medical necessity, and non-payment waivers for patient signing may all be addressed in real-time (i.e., while the patient is still in the physician office). Finally, a completed order requisition may be printed in the office for the patient to carry to a draw station (or patient is drawn in the office). The requisition contains tests ordered, draw and transport requirements, performing lab choices based on patient insurance, etc. This description represents just one of many possible optimized scenarios, based on available performing area labs, insurance restrictions, and other factors.

c. Medical Necessity/Billing compliance: If physician dictates CPT/ICD code combinations then a central speech to text conversion takes place similar to the process described in 'Pharmacy'; or the physician marks boxes on a billing form corresponding to the desired CPT/ICD code combinations. Once this step is complete then the selected CPT/ICD code combinations are compared to the history and examination recorded on the form (and thus captured in the computer). The physician is prompted in real time where billed charges are not supported by the document and/or the document supports billable charges that were not billed. This prompt may be in the form of a beep, voice message, display on a near-by computer screen and/or some combination of these events.

d. Billing and Receivables management: Once the physician and or billing supervisor verifies that the document and associated CPT/ICD code combinations are correct (through rules established by the practice—e.g., physician signs the report as the patient leaves the exam room and no medical necessity/billing compliance issues are detected by software) then the patient's account is automatically updated in the receivables management system (or a new account is automatically created) and a claim form is automatically prepared, and electronically transmitted to the appropriate clearing house (or directly to the insurance company). Insurance requests for clarification are typically automatically addressed with automatic Fax transmission or printing for mailing of the relevant patient record(s) or electronic transmission of the patient records where insurance company has this capability to handle an electronic record document. Accounts may be cycled with claims for copays to $2^{nd}$ insurance, statements printed for mailing to patients, etc. with very little human intervention, other than to answer patient inquiries which can't be handled by automated means (e.g., phone menu system, web site for account inquiry, update of insurance info. Etc.).

CONCLUSION

Although particular embodiments of the invention have been described in detail, it is understood that the invention is not limited correspondingly in scope, but also includes all changes, modifications and equivalents thereto and those coming within the spirit and terms of the claims appended hereto.

What is claimed is:

1. An information capturing system, comprising:
   a printed paper form having a plurality of unique printed data fields, each field containing a written message;
   a handheld writing device having a scanner component and a means for identifying each of said unique printed data fields;
   a communication means connected to said handheld writing device;
   a computer system connected to said communication means, said computer system having a processing algorithm and a database file with a plurality of fields;
   wherein said handheld writing device scanner is configured to scan the surface of said printed paper form and capture one of said written messages from one of said unique printed data fields and convert the message into a first data packet, the means for identifying each of said unique printed data fields identifies the field scanned and attaches an identifier to the first data packet, and the handheld device transmits said first data packet and identifier through said communication means to said computer system; and
   wherein said computer system applies said processing algorithm to said first data packet and said identifier, chooses one of said plurality of database file fields based upon said identifier and populates said chosen database file field with said first data packet.

2. The information capturing system of claim 1, wherein:
   the plurality of unique printed data fields each further contain a unique printed identifier; and
   the handheld device means for identifying each of said unique printed data fields comprises scanning unique printed identifier and generating a second data packet.

3. The information capturing system of claim 1 further comprising:
   a positional transmitter placed in a fixed location with respect to said printed form; and
   said handheld device further comprises a positional receiver;
   wherein said positional receiver generates the identifier based upon the location of the positional transmitter to the positional receiver as the written message is scanned.

4. The information capturing system of claim 1, wherein said computer system is located on said handheld device.

5. The information capturing system of claim 1, wherein;
   said handheld writing device further comprises a means for displaying a feedback communication; and
   said computer system further performs a processing function on said first data packet, and the processing function produces the feedback communication.

6. The information capturing system of claim 1, wherein the handheld device further comprises a writing element, and said written message is created by said writing element.

7. The information capturing system of claim 6, wherein said scanner is configured to scan said written message as it is written by said writing element.

8. The information capturing system of claim 7, wherein said writing element further comprises a pressure switch activated by writing upon said form, and said scanner is configured to scan when said switch is activated.

9. The information capturing system of claim 1, wherein;
   the handheld device further comprises an auditory recorder with a microphone input, said recorder configured to convert an auditory signal received by said microphone input into a second data packet; and
   the means for identifying each of said unique printed data fields further attaches a second identifier to the second data packet, and the handheld device transmits said second data packet and second identifier through said communication means to said computer system; and
   said computer system applies said processing algorithm to said second data packet and said second identifier, chooses one of said plurality of database file fields based upon said second identifier and populates said chosen database file field with said second data packet.

10. A method for capturing information, comprising the steps of:
    providing a printed paper form having a plurality of unique printed data fields, each field containing a written message;
    providing a handheld writing device having a scanner component and a means for identifying each of said unique printed data fields;
    providing a communication means connected to said handheld writing device;
    providing a computer system connected to said communication means, said computer system having a processing algorithm and a database file with a plurality of fields;
    scanning the surface of said printed paper form with said scanner;
    capturing one of said written messages from one of said unique printed data fields by said scanning;
    converting the message into a first data packet;
    identifying the field scanned with the handheld device means for identifying;
    said means for identifying further attaching an identifier to the first data packet;
    the handheld device transmitting and said first data packet and identifier through said communication means to said computer system;
    said computer system applying said processing algorithm and thereby processing said first data packet and said identifier;
    choosing one of said plurality of database file fields based upon said processing; and
    and populating said chosen database file field with said first data packet.

11. The method of claim 10, wherein:
    the plurality of unique printed data fields each further contain a unique printed identifier; and the step of identifying the field scanned comprises scanning a unique printed identifier associated with each of said printed data fields.

12. The method of claim 10, further comprising the steps of:
   providing a positional transmitter placed in a fixed location with respect to said printed form; and
   providing positional receiver on said handheld device;
   wherein said positional receiver generates the identifier based upon the location of the positional transmitter to the positional receiver as the written message is scanned.

13. The method of claim 10, further comprising the steps of locating said computer system on said handheld device.

14. The method of claim 10, further comprising the steps of:
   providing a means for displaying a feedback communication on said handheld device;
   said computer system further processing said first data packet to produce a feedback communication; and
   displaying the feedback communication on the displaying means.

15. The method of claim 10, further comprising the steps of:
   providing a writing element on the handheld device; and
   writing said written message with the writing element;
   wherein the step of scanning said message is performed as said message is being written.

16. The method of claim 15, further comprising the steps of:
   providing a pressure switch on the writing element; and
   activating said pressure switch by writing said message upon said printed form;
   wherein the step of scanning is dependent upon the activation of said switch.

17. The method of claim 10, further comprising the steps of:
   providing an auditory recorder with a microphone input on the handheld device, said recorder configured to convert an auditory signal received by said microphone input into a second data packet; and
   recording an auditory signal with said recorder;
   converting the auditory signal into a second data packet;
   identifying the second data packet with a second identifier;
   transmitting said second data packet and second identifier through said communication means to said computer system;
   said computer system applying said processing algorithm to said second data packet and said second identifier;
   said computer system choosing one of said plurality of database file fields based upon said second identifier;
   populating said chosen database file field with said second data packet.

* * * * *